United States Patent
Sandhu et al.

(10) Patent No.: US 8,514,736 B2
(45) Date of Patent: Aug. 20, 2013

(54) DETERMINING NEIGHBOR LISTS AND PN OFFSETS FOR NEW SECTOR

(75) Inventors: Sandip Sandhu, San Diego, CA (US); Derek Yachanin, San Diego, CA (US); Ryan Harsono, San Diego, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 343 days.

(21) Appl. No.: 12/980,542

(22) Filed: Dec. 29, 2010

(65) Prior Publication Data

US 2012/0134283 A1 May 31, 2012

Related U.S. Application Data

(60) Provisional application No. 61/418,206, filed on Nov. 30, 2010.

(51) Int. Cl.
*H04W 4/00* (2009.01)

(52) U.S. Cl.
USPC ........... 370/252; 370/331; 370/338; 370/389; 370/392

(58) Field of Classification Search
USPC .......................................... 370/252, 331, 338
See application file for complete search history.

(56) References Cited

U.S. PATENT DOCUMENTS

| | | | |
|---|---|---|---|
| 8,208,933 B1 * | 6/2012 | Talley et al. ................. | 455/446 |
| 2009/0245176 A1 * | 10/2009 | Balasubramanian et al. | 370/328 |
| 2009/0290502 A1 * | 11/2009 | Tinnakornsrisuphap et al. ............................ | 370/252 |

* cited by examiner

*Primary Examiner* — Brandon Renner

(57) ABSTRACT

A method and apparatus is provided for selecting a pseudo-noise (PN) offset for a newly deployed sector in a mobile communication network. A set of candidate PN offsets is determined and a priority factor for each candidate PN offset is determined based on a sector azimuth of the new sector, sector azimuths of sectors using the candidate PN offsets, or both. The PN offsets are ranked based on priority factor and distance to the new sector. A candidate PN offset is then selected from the candidate list based on the final ranking.

20 Claims, 7 Drawing Sheets

| SWITCH_ID | CELL_ID | CDMA SECTOR_ID | PN | PRIORITY | RANK |
|---|---|---|---|---|---|
| 7 | 229 | 3 | 390 | 2 | |
| 7 | 229 | 2 | 39 | 1 | |
| 7 | 229 | 1 | 183 | 2 | |
| 7 | 32 | 3 | 420 | 1 | |
| 7 | 32 | 2 | 342 | 1 | |
| 7 | 32 | 1 | 159 | 0 | |
| 7 | 92 | 3 | 411 | 2 | |
| 7 | 92 | 2 | 294 | 1 | |
| 7 | 92 | 1 | 189 | 2 | |
| 7 | 331 | 3 | 351 | 2 | |
| 7 | 331 | 2 | 456 | 1 | |
| 7 | 331 | 1 | 93 | 2 | |
| 7 | 291 | 3 | 444 | 2 | |
| 7 | 291 | 2 | 243 | 1 | |
| 7 | 291 | 1 | 174 | 2 | |
| 7 | 91 | 3 | 408 | 1 | |
| 7 | 91 | 2 | 354 | 2 | |
| 7 | 91 | 1 | 87 | 2 | |
| 7 | 110 | 3 | 414 | 1 | |
| 7 | 110 | 2 | 210 | 2 | |

FIG. 3

| Reject list 1 | | | | Reject list 2 | | | | | | | |
|---|---|---|---|---|---|---|---|---|---|---|---|
| N_Switch | N_Cell | N_Sec_Id | N_PN | N_Switch | N_Cell | N_Sec_Id | N_PN | NN_Switch | NN_Cell | NN_Sec_Id | NN_PN |
| 7 | 229 | 3 | 390 | 7 | 229 | 3 | 390 | 7 | 92 | 1 | 189 |
| 7 | 229 | 2 | 39 | 7 | 229 | 3 | 390 | 7 | 229 | 1 | 183 |
| 7 | 229 | 1 | 183 | 7 | 229 | 3 | 390 | 7 | 229 | 2 | 39 |
| 7 | 32 | 3 | 420 | 7 | 229 | 3 | 390 | 1 | 229 | 1 | 504 |
| 7 | 32 | 2 | 342 | 7 | 229 | 3 | 390 | 1 | 596 | 2 | 507 |
| 7 | 32 | 1 | 159 | 7 | 229 | 3 | 390 | 1 | 596 | 3 | 510 |
| 7 | 92 | 3 | 411 | 7 | 229 | 3 | 390 | 7 | 596 | 3 | 420 |
| 7 | 92 | 2 | 294 | 7 | 229 | 3 | 390 | 7 | 32 | 2 | 294 |
| 7 | 92 | 1 | 189 | 7 | 229 | 3 | 390 | 7 | 92 | 1 | 174 |
| 7 | 331 | 3 | 351 | 7 | 229 | 3 | 390 | 7 | 291 | 2 | 243 |
| 7 | 331 | 2 | 456 | 7 | 229 | 3 | 390 | 7 | 291 | 3 | 12 |
| 7 | 331 | 1 | 93 | 7 | 229 | 3 | 390 | 7 | 293 | 1 | 93 |
| 7 | 291 | 3 | 444 | 7 | 229 | 3 | 390 | 7 | 331 | 2 | 456 |
| 7 | 291 | 2 | 243 | 7 | 229 | 3 | 390 | 15 | 331 | 1 | 237 |
| 7 | 291 | 1 | 174 | 7 | 229 | 3 | 390 | 7 | 8 | 1 | 159 |
| 7 | 91 | 3 | 408 | 7 | 229 | 3 | 390 | 7 | 32 | 2 | 342 |
| 7 | 91 | 2 | 354 | 7 | 229 | 3 | 390 | 7 | 32 | 1 | 87 |
| 7 | 91 | 1 | 87 | 7 | 229 | 3 | 390 | 7 | 91 | 3 | 408 |
| 7 | 110 | 3 | 414 | 7 | 229 | 3 | 390 | 7 | 91 | 3 | 411 |
| 7 | 110 | 2 | 210 | 7 | 229 | 3 | 390 | 7 | 92 | 1 | 24 |
| Ⓐ | Ⓑ | Ⓒ | Ⓓ | Ⓔ | Ⓕ | Ⓖ | Ⓗ | Ⓘ | Ⓙ | Ⓚ | Ⓛ |

FIG. 4A

| A | B | C | D | E | F | G | H | I | J | K | L |
|---|---|---|---|---|---|---|---|---|---|---|---|
|   |   |   |   | 7 | 229 | 3 | 390 | 7 | 111 | 3 | 495 |
|   |   |   |   | 7 | 229 | 3 | 390 | 7 | 253 | 1 | 255 |
|   |   |   |   | 7 | 229 | 3 | 390 | 7 | 253 | 2 | 378 |
|   |   |   |   | 7 | 229 | 3 | 390 | 7 | 86 | 2 | 276 |
|   |   |   |   | 7 | 229 | 3 | 390 | 7 | 270 | 2 | 219 |
|   |   |   |   | 7 | 229 | 2 | 39 | 7 | 91 | 3 | 408 |
|   |   |   |   | 7 | 229 | 2 | 39 | 7 | 91 | 1 | 87 |
|   |   |   |   | 7 | 229 | 2 | 39 | 7 | 229 | 1 | 183 |
|   |   |   |   | 7 | 229 | 2 | 39 | 7 | 229 | 3 | 390 |
|   |   |   |   | 7 | 229 | 2 | 39 | 7 | 291 | 2 | 243 |
|   |   |   |   | 7 | 229 | 2 | 39 | 1 | 596 | 3 | 510 |
|   |   |   |   | 7 | 229 | 2 | 39 | 1 | 596 | 2 | 507 |
|   |   |   |   | 7 | 229 | 2 | 39 | 1 | 596 | 1 | 504 |
|   |   |   |   | 7 | 229 | 2 | 39 | 7 | 92 | 2 | 294 |
|   |   |   |   | 7 | 229 | 2 | 39 | 7 | 110 | 3 | 414 |
|   |   |   |   | 7 | 229 | 2 | 39 | 15 | 8 | 1 | 237 |
|   |   |   |   | 7 | 229 | 2 | 39 | 15 | 21 | 2 | 231 |
|   |   |   |   | 7 | 229 | 2 | 39 | 15 | 40 | 1 | 57 |
|   |   |   |   | 7 | 229 | 2 | 39 | 7 | 91 | 2 | 354 |

FIG. 4B

| Allowed PN | |
|---|---|
| PN | Distance |
| 3 | 14.16755 |
| 27 | 12.21294 |
| 9 | 11.00731 |
| 6 | 10.7346 |
| 18 | 9.118146 |
| 42 | 9.100865 |
| 36 | 8.230599 |
| 33 | 7.923107 |
| 81 | 7.643949 |
| 21 | 7.16855 |
| 318 | 7.149922 |
| 303 | 6.281192 |
| 207 | 6.197836 |
| 459 | 6.07544 |
| 330 | 5.904919 |
| 312 | 5.537024 |
| 126 | 5.433692 |
| 54 | 5.404668 |
| 180 | 5.37963 |
| 309 | 5.338286 |
| 45 | 5.308771 |
| 486 | 5.161009 |
| 417 | 5.038223 |
| 285 | 4.98304 |
| 30 | 4.977595 |
| 369 | 4.977595 |
| 375 | 4.911782 |
| 108 | 4.911782 |
| 66 | 4.893962 |
| 321 | 4.893962 |
| 168 | 4.850281 |
| 225 | 4.843451 |
| 501 | 4.804199 |
| 72 | 4.707038 |
| 381 | 4.707038 |
| 201 | 4.589494 |
| 48 | 4.579999 |
| 471 | 4.421587 |
| 453 | 4.412309 |

FIG. 5

DETERMINING NEIGHBOR LISTS AND PN OFFSETS FOR NEW SECTOR

RELATED APPLICATION

This application claims the benefit of U.S. Provisional Patent Application 61/418,206 filed Nov. 30, 2010, which is incorporated herein by reference.

BACKGROUND

The present invention relates generally to cell planning and, more particularly, to the automated systems for determining neighbor lists and PN offsets for newly deployed cells and/or sectors.

In Wideband Code Division Multiple Access (WCDMA) networks, pilot signals transmitted by different base stations and sectors are distinguished by the use of different phase offsets of the same pseudorandom noise (PN) sequence. The PN offset enables the mobile terminals to differentiate between different sectors when implementing cell search algorithms for mobility management purposes. Conventionally, a network administrator assigns the PN offsets to the sectors within a network so that neighboring sectors do not have the same PN offset. The main goal is to prevent interference or aliasing with other sectors in the area. However, as network operators increase the number of sectors to provide better coverage, it becomes increasingly difficult to avoid conflicts.

There are currently two existing methods for determining PN offsets for new sectors that are widely used in the industry. A first method uses radio frequency (RF) propagation prediction software to estimate interference between sectors. The PN offset with the least network impact is chosen as the PN offset for the new sector. This method has drawbacks related to using estimation methods as opposed to actual measurements of conditions. Furthermore, neighbor list information is not always considered and no PN conflict calculations are made. A PN conflict is occurs when 1) at least two different sectors are serving a common area with an identical PN offset, or 2) the neighbor list of a sector contains of at least two neighbor sectors with an identical PN offset.

A second method commonly used is based only on analysis of a neighbor list. This method begins with a list of possible PN offsets and uses the neighbor list to eliminate first second and third degree neighbors. This method does not take into account mitigating factors such as distance and terrain, and, consequently, may result in the elimination of many PN offsets that would be acceptable. The result is a reduced candidate set which makes it very difficult to find PN offsets in areas with many cell sites, such as a typical metro downtown.

There are also two commonly used methods for determining a neighbor list for a new sector. The RF prediction method is used to populate the neighbor list of a new sector with x (e.g., 15, 20, etc.) sectors that have the strongest signal in the coverage area of the new sector. This method does not rely on actual RF measurements and that alone makes the initial neighbor list inaccurate in most cases. The second method involves using a map and visually selecting the nearest sectors to determine the a neighbor list. The second method does not use all network information available and also relies on the user to include factors such as terrain to come up with an initial neighbor list.

Accordingly, there is a need for improved methods to more accurately determine a neighbor list and PN offset for a newly deployed sector in a mobile communication network

SUMMARY

The present invention provides a method and apparatus for determining a neighbor list and PN offset for a new sector in a mobile communication network. The method can be implemented using a computer program to analyze network configuration data, terrain information, and other information to create a neighbor list and select a PN offset for a new sector.

The basic process for determining a PN offset in WCDMA systems according to one embodiment can be broken down into two phases. In the first phase, a neighbor list (NL) is defined for a newly added sector. The construction of the NL may take many factors into account including the location of the new sector and existing sectors, the azimuth of the new sector and existing sectors, and the terrain between the new sector and existing sectors. Drive test measurements indicating the frequency, received signal strength (RSS), and other characteristics of signals being transmitted from existing sectors may be used to confirm the final NL. In the second phase, the NL for the new sector is used to reduce a candidate set of PN offsets. A priority factor is then assigned to each surviving PN offset. The PN offsets are then ranked based on the priority factor and distance from the new sector. The PN offset is selected from the top candidates on the final PN offset list. In computing the priority factor, factors such as the azimuth of the new sector and existing sectors using the PN offsets and the terrain between the new sector and existing sectors using the PN offsets may be considered. Drive test measurements may be used to confirm the final PN offset selection.

Exemplary embodiments of the invention comprise methods of determining PN offsets for new sectors in a mobile communication network. In one exemplary method, a neighbor list including neighbor sectors for the new sector and an initial PN offset list including a list of candidate PN offsets are determined. Candidate PN offsets are eliminated from the initial PN offset list based on the neighbor list. A priority factor is determined for surviving PN offsets in the PN offset list based on a sector azimuth of the new sector, sector azimuths of the sectors assigned the candidate PN offsets, or both. The surviving PN offsets are then ranked based on the first priority factor and distance of the assigned sector from the new sector and a PN offset is selected from the candidate PN offsets based on the ranking. A transmitter in the new sector is configured to transmit a PN sequence with the selected PN offset Other embodiments of the invention comprise a data processing and analyzing node for determining neighbor lists and PN offsets for new sectors in a mobile communication network. In one exemplary embodiment, the data processing and analyzing node comprises a network interface for communicating with other network nodes to gather network configuration data, and a processor circuit for processing the network configuration data to determine a neighbor list and select a PN offset for a new sector. The processor circuit determines a neighbor list for the new sector and an initial PN offset list including a list of PN offsets and corresponding sectors. The processor circuit eliminates PN offsets from the initial PN offset list based on the neighbor list. The processor circuit then determines a first priority factor for surviving PN offsets in the PN offset list based on a sector azimuth of the new sector, sector azimuths of the sectors assigned the candidate PN offsets, or both. The processor circuit ranks surviving PN offsets based on the first priority factor and distance of the assigned sector from the new sector and selects a PN offset based on the ranking. The processor circuit then configures a transmitter in the new sector to transmit a PN sequence with the selected PN offset.

The methods and apparatus according to the present invention can result helps improve efficiency of network maintenance tasks, which could translate into millions of dollars in savings for network operators. Additionally, the present invention helps to optimize selection of neighbor lists and PN offset for new sectors, which results in lower interference, better performance, and better perceived quality of service from a customer point of view.

BRIEF DESCRIPTION OF THE DRAWINGS

FIG. 3 illustrates a hypothetical neighbor list generated by the DPAN

FIGS. 4A and 4B illustrate a hypothetical reject list generated by the DPAN containing rejected PN offsets.

FIG. 5 illustrates a hypothetical prioritized PN offset list generated by the DPAN.

DETAILED DESCRIPTION

Figure 1:
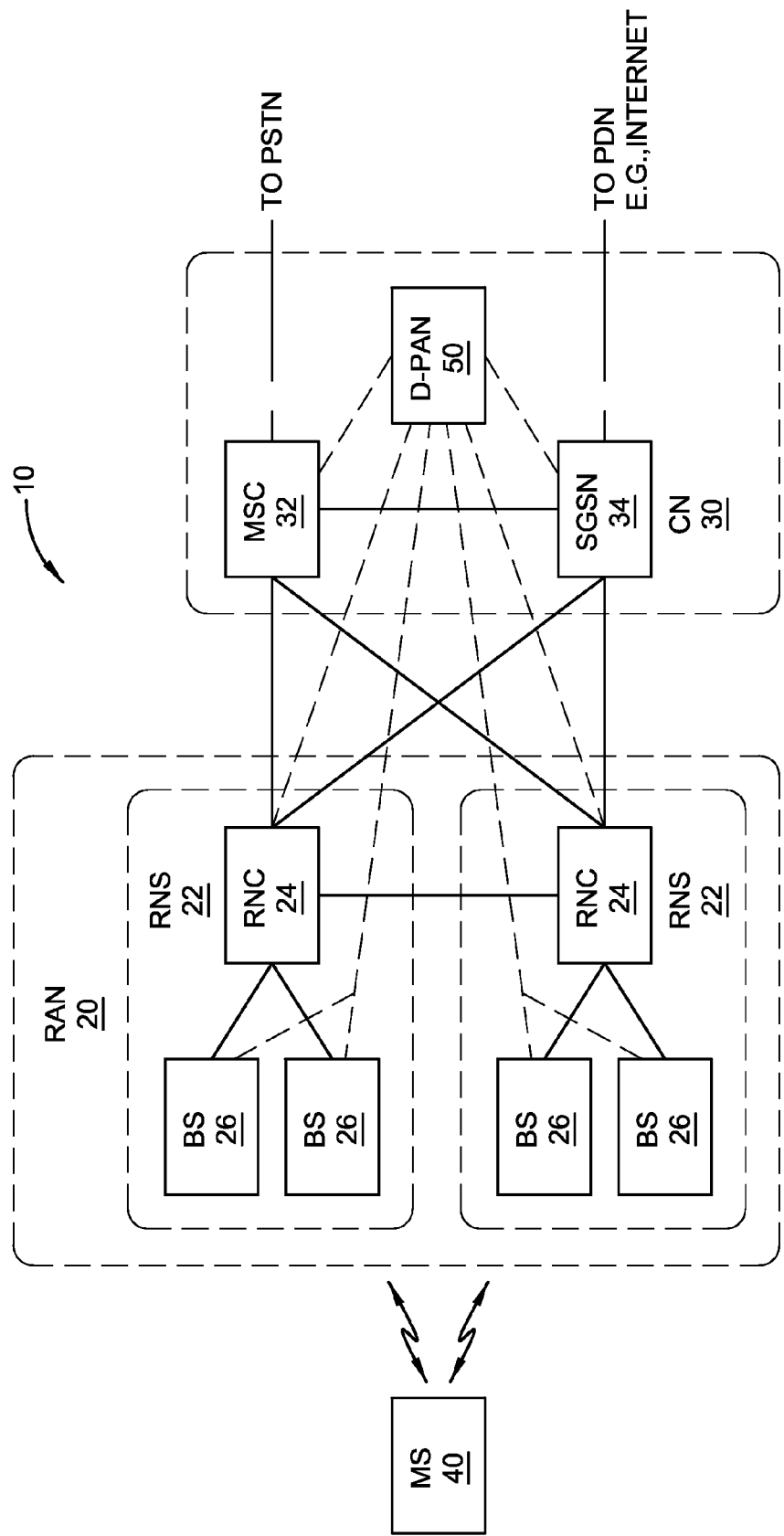
FIG. 1 illustrates an exemplary communication network including a data processing and analyzing node (DPAN).

Referring now to the drawings, FIG. 1 illustrates an exemplary wireless communication network 10 implementing automated network planning as herein described. The wireless communication network 10 shown is based on the Universal Mobile Telecommunication Services (UMTS) network architecture, which is used in Wideband Code Division Multiple Access (WCDMA) systems. However, it should be understood that the present invention is not limited to a particular network architecture and may be implemented in networks based on other standards, such as Long-Tem Evolution (LTE) networks and Worldwide Interoperability for Microwave Access (WiMAX) networks.

The wireless communication network comprises a core network (CN) 30 connecting to one or more external packet data networks, such as the Internet, and one or more radio access networks (RANs) 20. Only one RAN 20 is shown. The core network 30 is responsible for switching and routing of calls between the mobile stations 100 and external networks. The core network 30 may include a Mobile Switching Center (MSC) 32 for providing circuit-switched services and a Serving GPRS Support Node (SGSN) 34 for providing packet switched services.

The RAN 20 includes one or more radio network subsystems (RNSs) 22 providing mobile terminals 100 with access to the core network 30. An RNS 22 comprises a radio network controller (RNC) 24 and one or more base stations (BSs) 26, referred to in the WCDMA standards as Node Bs. This application uses the generic term base station (BS) instead of the WCDMA-specific term Node B. The BSs 26 communicate with the mobile stations 100 over the air interface and are normally associated with a cell, which may include multiple sectors. A BS 26 may provide service in more than one cell. The RNC 24 connects the RAN 20 to the core network 30 and controls RAN functions. The RNC 24 manages the BSs 26 and radio resources within its domain and terminates Radio Resource Control (RRC). RRC is a protocol that provides control over the mobile station by the RNC 24. The RRC functions performed by the RNC 24 include measurement reporting, active set management and handover control.

The wireless communication network 10 also includes a Data Processing and Analyzing Node (D-PAN) 50, which is typically located in the CN 30, to perform automated network planning. The D-PAN 50 collects data from other network nodes (e.g. BSs 26, RNCs 24, MSC 32, and SGSN 34) related to network configuration and analyzes the network configuration data to determine configurations for newly deployed cells or sectors. As will be described below, the D-PAN 50 may be used to automate the assignment of cell identifiers, such as the pseudorandom noise (PN) offsets in WCDMA networks or the Physical Cell Identifier (PCID) in LTE networks, when new sectors are deployed.

The basic process for determining a PN offset in WCDMA systems according to one embodiment can be broken down in to two phases. In the first phase, a neighbor list (NL) is defined for a newly added sector. The construction of the NL may take many factors into account including the location of the new sector and existing sectors, the azimuth of the new sector and existing sectors, and the terrain between the new sector and existing sectors. Drive test measurements indicating the frequency, received signal strength (RSS), and other characteristics of signals being transmitted from existing sectors may be used to confirm the final NL. In the second phase, the NL for the new sector is used to reduce a candidate set of PN offsets. A priority factor is then assigned to each surviving PN offset. The PN offset are then ranked based on the priority factor and distance to other sectors using the same PN offset. The PN offset is selected based on the ranking. In computing the priority factor, the DPAN 50 may consider factors such as the azimuth of the new sector and existing sectors using the PN offsets, the terrain between the new sector and existing sectors using the PN offsets. Drive test measurements may be used to confirm the final PN offset selection.

Figure 2:
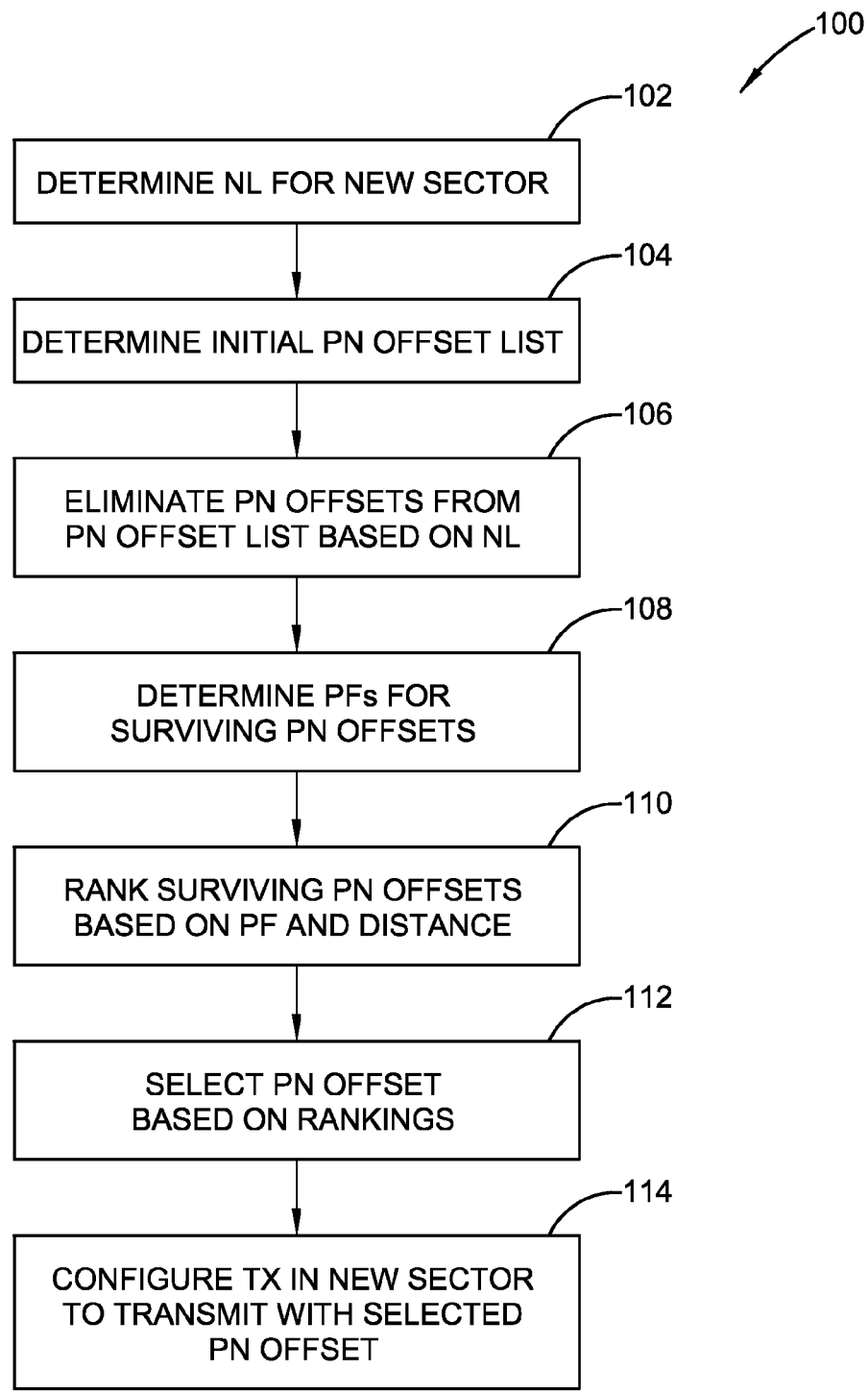
FIG. 2 illustrates an exemplary method implemented by the DPAN for determining a neighbor list (NL) and PN offset for a new sector when the new sector is being deployed in the mobile communication network.

FIG. 2 illustrates an exemplary process 100 performed by the DPAN 50 for determining a PN offset for a new sector in a WCDMA system. It is assumed that the DPAN 50 has previously collected and stored data relating to network topology and configuration, terrain, and other relevant data. To begin, the DPAN 50 determines a NL for the new sector to be deployed (block 102) and an initial PN offset list (block 104). An initial NL can be constructed using location information. The initial NL can then be reduced based on sector azimuths, terrain, and other data to arrive at a final NL that is used in the PN offset selection process. The initial PN offset list may comprise a superset of all possible PN offsets except for those reserved for special events or temporary sites for heavy use conditions (e.g. temporary site for stadium).

One exemplary process for determining the NL begins with a list of neighbor sectors within a predetermined distance of the new sector. The DPAN 50 then eliminates neighbor sectors from the list that are blocked by terrain and prioritizes the remaining neighbor sectors on the list. More particularly, the DPAN 50 assigns a priority factor to each neighbor sector based at least in part on the on the sector azimuth of the new sector, the sector azimuths of the neighbor sectors, or both. Other information, such as the terrain between the new sector and neighbor sectors may also be considered in determining the priority factor. In one exemplary embodiment, the NL is determined as follows:

1. Use sector location information to get a list of all neighbor sectors within x miles (typically 20) of the new sector. Give all neighbor sectors the highest priority factor (PF), i.e., PF=0.

2. Use digitized terrain information to remove all neighbor sectors blocked from the new sector by high terrain, e.g., terrain height more than y (typically 5) times the average height of the line connecting the new sector to the neighbor sector.
3. For each neighbor sector in the list, increase the PF (increasing the PF lowers the priority in this case) by one if the new sector points away from the neighbor sector.
4. For each neighbor sector in the list, increase the PF by one if the neighbor sector points away from the new sector.
5. Sort the neighbor list with increasing PF and decreasing distance. The top z (usually 20 or 40 or less) entries become the prioritized neighbor list for the new sector.
6. Verify the neighbor list by using the PN and Pilot Ec measurements from the latest drive test. Eliminate neighbor sectors that have Pilot Ec measurements less than a defined threshold within x miles of the new sector.

As indicated above, each neighbor sector starts with the same priority factor. The priority factors are adjusted upward based on the direction the sectors point. Consideration of the direction or azimuth could take into account the beam width of the sectors with some tolerance values to include major side lobes. For example, the DPAN 50 may compute an effective angle between the sector azimuth of the existing sector and a reference line extending from the new sector to the existing sector. If the angle is greater than a threshold, the priority factor is increased.

Once the NL and initial PN offset list are completed, the DPAN 50 then begins to eliminate PN offsets to arrive at the final PN offset list. The elimination process begins with the DPAN 50 eliminating PN offsets assigned to first, second, and third degree neighbor sectors (block 106). First degree neighbor sectors comprise the sectors on the final NL list. Second degree neighbor sector comprise those sectors in the NLs for the first degree neighbor sectors. Third degree sectors comprise those sectors in the NLs for the second degree neighbor sectors.

FIG. 3 is an excerpt of a hypothetical NL for a new sector. The neighbor sectors are identified by the triplet Switch_ID, Cell_ID, and SectorID. The PN column identifies the index of the PN offset used by the sector. The priority column gives the priority of the neighbor, which is useful when a mobile terminal is switching sectors. FIGS. 4A and 4B illustrate reject lists containing first and second degree neighbor sectors. It will be appreciated that the PN offsets assigned to the sectors in the reject list should not be used by the new sector due to the proximity of the sector to the new sector. Reject List 1 identifies first degree neighbors and corresponding PN offsets. Reject List 2 identifies second degree neighbors and corresponding PN offsets. Though not shown, a similar reject list is constructed for third degree neighbors. In Reject List 2, it will be noted that the first four columns of information relate to first degree neighbor sectors, and the last four columns relate to the second degree neighbor sectors. In this example, the first degree neighbor sector identified by the triplet 7/229/3 has 25 neighbor sectors.

Returning back to FIG. 2, after eliminating of the PN offsets for first, second and third degree neighbor sectors, the DPAN 50 determines a priority factor for all the surviving PN offsets (block 108). The determination of the priority factor is based, at least in part, on the sector azimuth of the new sector, the sector azimuths of the existing sectors assigned one of the surviving PN offsets, or both. Other information, such as the terrain between the new sector and existing sectors may also be considered in determining the priority factor. In one exemplary embodiment, the priority factor is determined as follows:

1) assign each surviving PN offset a priority factor of 3 (or other arbitrary starting value)
2) for each surviving PN offset, decrease the priority factor by 1 if the new sector points away from the sector assigned the PN offset,
3) for each surviving PN offset, decrease the priority factor by 1 if the sector assigned the PN offset points away from the new sector,
4) decrease priority factor by one for each surviving sector that is blocked by terrain from the new sector.

As indicated above, each surviving PN offset starts with the same priority factor. The priority factors are adjusted down based on the direction the corresponding sectors point. Consideration of the direction or azimuth could also take into account the beam width of the sectors to avoid assigning the same PN offset to two sectors with intersecting beams. For example, the DPAN 50 may compute an effective angle between the sector azimuth of the existing sector and a reference line extending from the new sector to the existing sector. If the angle is greater than a threshold, the priority factor is reduced. The threshold may be varied depending on the beam width. That is a greater angle may be required as the beam width increases.

The terrain conditions between the new sector and the existing sector can also be considered. More particularly, the DPAN 50 may lower the priority factor where there is high terrain between the existing sector and the new sector that blocks the existing sector from the new sector. As an example, the DPAN 50 may lower the priority factor when the terrain is more than y (e.g., y=5) times the average height of a line connecting the new sector with the existing sector.

Once the priority factors are finally determined, the DPAN 50 ranks the PN offsets based on priority factor and/or distance (block 110) and selects the top candidate (block 112). FIG. 5 illustrates a hypothetical ranking of PN offsets by decreasing distance. The distance and priority factors can be weighted according to the morphology and land use of the area surrounding the new sector. In some embodiments, the selection may be confirmed by drive tests measurements in the area surrounding the new sector to ensure that the pilot $E_c$ is below a threshold in the expected coverage area.

Figure 6:
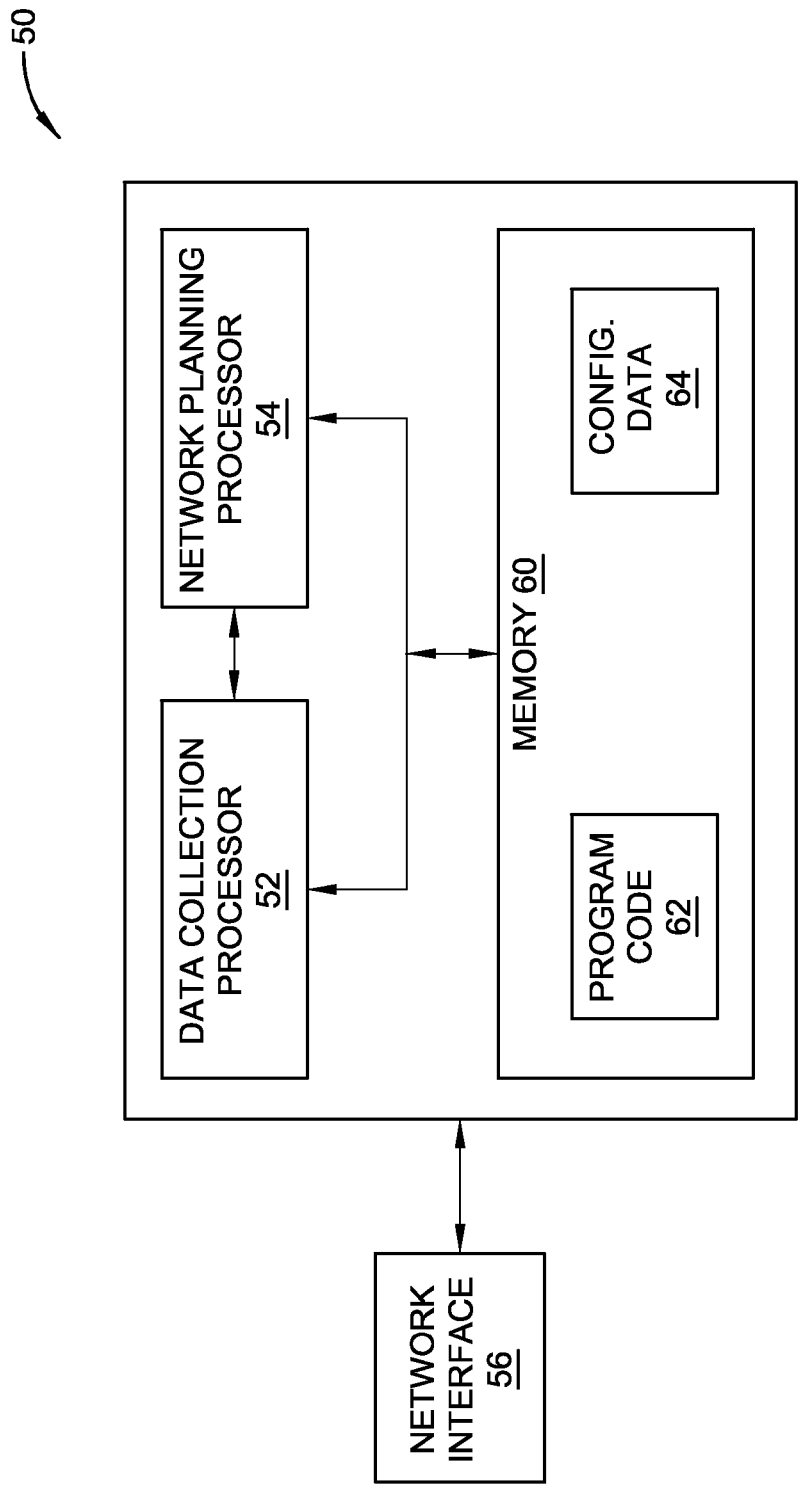
FIG. 6 illustrates the main functional components of the DPAN.

The process for determining a NL and PN offset for the new sector can be implemented by a computer program using network configuration data, terrain information, and drive test measurements input by a network operator or reported by mobile terminals. FIG. 6 illustrates an exemplary DPAN 50 configured to perform network planning as herein described. The DPAN 50 comprises a processor circuit 52 and network interface 58. The processor circuit 52 may include one or more microprocessors, hardware, firmware, or a combination thereof. In the exemplary embodiment, the processor circuit 52 comprises a data collection processor 54, network planning processor 56, and memory 60. The data collection processor 54 is responsible for collecting network configuration data from other nodes within the network and storing the network configuration data in memory 60. The network planning processor 56 includes the logic for analyzing the network configuration data, terrain data, and other information to determine a NL and PN offset for a new sector as herein described. Those skilled in the art will appreciate that the data collection processor 54 and network planning processor 56 may be implemented or combined in a single processor. Memory 60 stores program code 62 which when executed by the processor circuit 52 performs the methods described herein. Memory 60 also stores the network configuration data 64 used by the network planning processor 56. The network interface circuit 56 connects the DPAN 50 to the communication network and enables the DPAN 50 to communicate with other nodes within the network. The network interface circuit 58 may comprise a wired interface such as an Ethernet interface, or a wireless interface.

What is claimed is:

1. A method of selecting a pseudo-noise (PN) offset for a newly deployed sector in a mobile communication network, said method comprising:
    determining a neighbor list including neighbor sectors of the new sector;
    determining an initial PN offset list including a list of PN offsets and corresponding sectors;
    eliminating PN offsets from the initial PN offset list based on the neighbor list;
    determining a first priority factor for surviving PN offsets in the PN offset list based on a sector azimuth of the new sector, sector azimuths of the sectors assigned the candidate PN offsets, or both;
    ranking the surviving PN offsets based on the first priority factor and distance of the assigned sector from the new sector;
    selecting a PN offset based on the ranking; and
    configuring a transmitter in the new sector to transmit a PN sequence with the selected PN offset.

2. The method of claim 1 wherein the first priority factor is further based on terrain between the new sector and the sectors assigned the candidate PN offsets.

3. The method of claim 1 wherein ranking the surviving PN offsets comprises computing a weighted combination of the distance and first priority factor for each PN offset.

4. The method of claim 1 further comprising verifying PN selection based on drive test measurements.

5. The method of claim 1 wherein determining a neighbor list containing PN offsets for a plurality of neighboring sectors comprises:
    determining an initial neighbor list containing PN offsets for a plurality of neighboring sectors;
    determining the sectors in said neighbor list based on sector azimuths of the new sector and the neighboring sectors;
    determining a final neighbor list based on the rankings.

6. The method of claim 1 wherein eliminating PN offsets from the initial PN offset list based on an initial neighbor list comprises eliminating PN offsets assigned to first, second, and third degree neighbor sectors.

7. The method of claim 1 wherein determining said neighbor list for the new sector comprises:
    determining an initial neighbor list based on distance of neighboring sectors from said new sector;
    assigning a second priority factor to said neighbor sectors in said initial neighbor list based on a sector azimuth of the new sector, sector azimuths of the neighbor sectors, or both;
    ranking the neighbor sectors based on the second priority factor and distance of the neighbor sector from the new sector;
    selecting neighbor sectors for inclusion in a final neighbor list based on the rankings.

8. The method of claim 7 wherein the second priority factor is further based on terrain between the new sector and the neighbor sectors.

9. The method of claim 7 wherein ranking the neighbor sectors based on the second priority factor and distance of the neighbor sector from the new sector comprises computing a weighted combination of the distance and second priority factor for each neighbor sector.

10. The method of claim 5 further comprising verifying the final neighbor list based on drive test measurements.

11. A data processing and analyzing node in a mobile communication network for selecting a pseudo-noise (PN) offset for a newly deployed sector in a mobile communication network, said node comprising:
    a network interface for communicating with other network nodes to gather network configuration data;
    a processor circuit for processing the network configuration data to select a PN offset for a new sector, said processor circuit configured to:
    determine a neighbor list for the new sector;
    determine an initial PN offset list including a list of PN offsets and corresponding sectors;
    eliminate PN offsets from the initial PN offset list based on the neighbor list;
    determine a first priority factor for surviving PN offsets in the PN offset list based on a sector azimuth of the new sector, sector azimuths of the sectors assigned the candidate PN offsets, or both;
    rank surviving PN offsets based on the first priority factor and distance of the assigned sector from the new sector;
    select a PN offset based on the ranking; and
    configure a transmitter in the new sector to transmit a PN sequence with the selected PN offset.

12. The data processing and analyzing node of claim 11 wherein the processor circuit determines the first priority factor further based on terrain between the new sector and the sectors assigned the candidate PN offsets.

13. The data processing and analyzing node of claim 11 wherein the processor circuit ranks the surviving PN offsets by computing a weighted combination of the distance and first priority factor for each PN offset.

14. The data processing and analyzing node of claim 11 wherein the processor circuit is further configured to verify PN selection against drive test measurements input by an operator.

15. The data processing and analyzing node of claim 1 wherein the processor circuit determines a neighbor list containing PN offsets for a plurality of neighboring sectors by:
    determining an initial neighbor list containing PN offsets for a plurality of neighboring sectors;
    determining the sectors in said neighbor list based on sector azimuths of the new sector and the neighboring sectors;
    determining a final neighbor list based on the rankings.

16. The data processing and analyzing node of claim 11 wherein the processor circuit eliminates PN offsets from the initial PN offset list by eliminating PN offsets assigned to first, second, and third degree neighbor sectors.

17. The data processing and analyzing node of claim 11 wherein the processor circuit determines said neighbor list for the new sector by:
    determining an initial neighbor list based on distance of neighboring sectors from said new sector;
    assigning a second priority factor to said neighbor sectors in said initial neighbor list based on a sector azimuth of the new sector, sector azimuths of the neighbor sectors, or both;
    ranking the neighbor sectors based on the second priority factor and distance of the neighbor sector from the new sector;
    selecting neighbor sectors for inclusion in a final neighbor list based on the rankings.

18. The data processing and analyzing node of claim 17 wherein the processor circuit determines the second priority factor further based on terrain between the new sector and the neighbor sectors.

19. The data processing and analyzing node of claim 17 wherein the processor circuit ranks the neighbor sectors by computing a weighted combination of the distance and second priority factor for each neighbor sector.

20. The data processing and analyzing node of claim 15 wherein the processor circuit is further configured to verify the final neighbor list based on drive test measurements input by an operator.

\* \* \* \* \*

UNITED STATES PATENT AND TRADEMARK OFFICE
CERTIFICATE OF CORRECTION

PATENT NO.          : 8,514,736 B2                              Page 1 of 1
APPLICATION NO.     : 12/980542
DATED               : August 20, 2013
INVENTOR(S)         : Sandhu et al.

It is certified that error appears in the above-identified patent and that said Letters Patent is hereby corrected as shown below:

On the Title Page, in Column 1, Item (51), under "Int. Cl.",
insert -- G01R 31/08 (2006.0) H04L 12/28 (2006.0) --.

In the Specification:

In Column 1, Line 61, delete "the a" and insert -- the --, therefor.

In Column 1, Line 67, delete "network" and insert -- network. --, therefor.

In Column 2, Line 45, delete "offset" and insert -- offset. --, therefor.

In Column 3, Line 20, delete "DPAN" and insert -- DPAN. --, therefor.

In Column 3, Line 40, delete "Long-Tem" and insert -- Long-Term --, therefor.

In Column 6, Line 5, delete "value)" and insert -- value), --, therefor.

In the Claims:

In Column 8, Line 41, in Claim 15, delete "claim 1" and insert -- claim 11 --, therefor.

Signed and Sealed this
Eleventh Day of February, 2014

Michelle K. Lee
*Deputy Director of the United States Patent and Trademark Office*